Dec. 15, 1953 A. P. DOUGLAS ET AL 2,662,579
BABY WALKER
Filed May 20, 1950 2 Sheets-Sheet 1

INVENTORS,
ALVIN P. DOUGLAS
LEONARD J. WALTERS
BY Fay, Golrick & Fay
ATTORNEYS

Dec. 15, 1953     A. P. DOUGLAS ET AL     2,662,579
BABY WALKER
Filed May 20, 1950     2 Sheets-Sheet 2
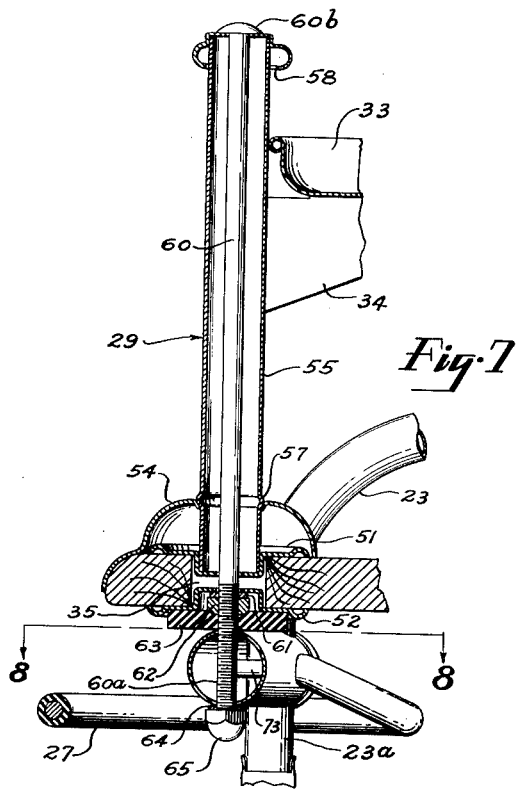
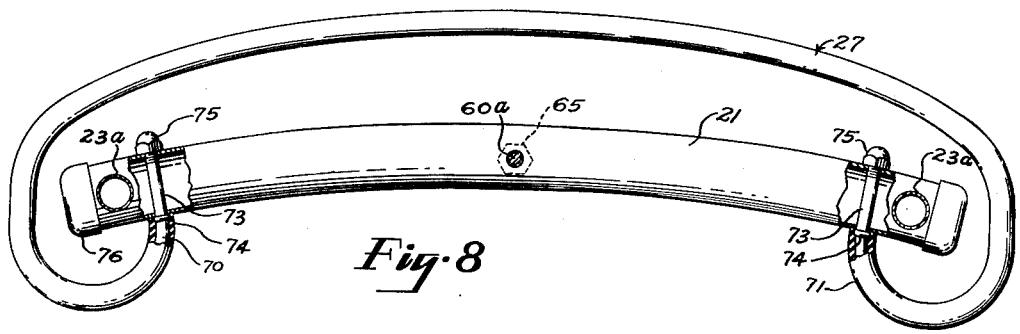
INVENTORS.
ALVIN P. DOUGLAS
LEONARD J. WALTERS
BY *Fay, Golrick & Fay*
ATTORNEYS Patented Dec. 15, 1953

2,662,579

UNITED STATES PATENT OFFICE 2,662,579

BABY WALKER

Alvin P. Douglas, Cleveland, and Leonard J. Walters, Shaker Heights, Ohio, assignors to The Murray Ohio Manufacturing Company, Cleveland, Ohio, a corporation of Ohio Application May 20, 1950, Serial No. 163,253

8 Claims. (Cl. 155—22)

The present invention relates to improvements in the construction of the type of infant vehicles commonly known as baby walkers. The general object of the invention is the provision of a new and improved structure for a baby walker, having a tubular chassis structure.

An object of the invention is the provision of a resiliently mounted seat member in such a vehicle.

Another object of the invention is the provision of such a vehicle which is sturdy, yet of low cost in manufacture, and of portably light and balanced weight.

Another object is to provide a structure for such a vehicle which can be manufactured and shipped in sub-assemblies that may be readily and correctly assembled at sales distribution points.

Other objects and advantages of the invention will be apparent from the following detailed description of preferred forms of embodiment of the invention, reference being made to the accompanying drawings wherein—

Fig. 7 is a vertical median section taken through the front post assembly at the line 7—7 in Fig. 2 showing in detail the structure of the post and the structural relation of other members attached to the front crossbar; and Fig. 8 is a view taken along the line 8—8 in Fig. 7 showing in detail the front crossbar and front bumper construction.

Figure 1:
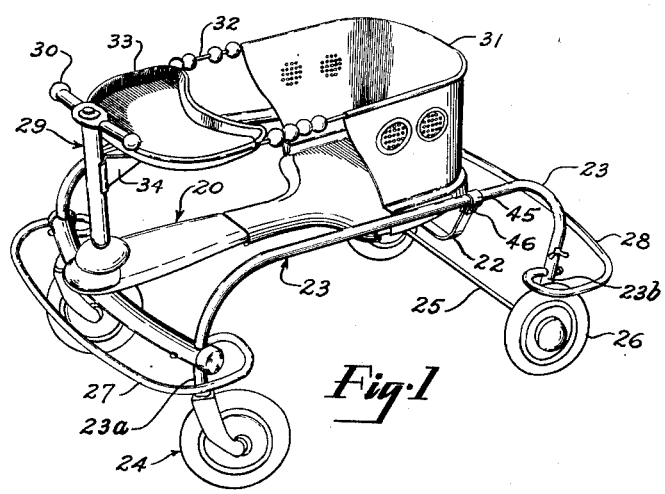
Fig. 1 is a general view in perspective of a baby walker of this invention.
Figure 2:
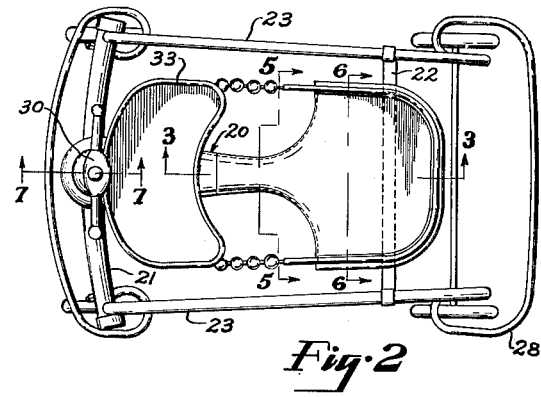
Fig. 2 is a top view corresponding to Fig. 1.

The baby walker shown in Figs. 1 and 2 comprises a passenger supporting or seat member 20 which is resiliently supported, as will be hereinafter described, by a front crossbar 21 and a rear cross-strap 22; curved side members 23 on either side of the vehicle which are formed in a generally inverted U-shape of metal tubes curving downwardly at their forward ends to pass through the tubular front crossbar 21 for mounting swiveled front wheels, generally indicated 24, and downwardly at the rear ends, through which the rear axle 25 is passed to mount the wheels 26. The forward end of each side member 23 terminates in a straight vertical section 23a which is pressed through apertures formed in crossbar 21, wherein it is held by brazing. These straight vertical ends 23a of members 23 extend below the tube 21 a slight distance and provide simple, strong sockets for receiving the outer fixed sleeve of the caster type mountings of front wheels 24. The downwardly extending rear sections 23b of members 23 are directed forwardly to adapt them for attachment of the upwardly extending tubes of a tubular handle which may be provided for the vehicle. Inward from each end, the axle 25 is provided with nibs or projections which serve to space the rear portions of members 23. The proportioning of the inverted U shapes of the side tubes 23, it will be noted, is such that substantially horizontal reaches thereof are disposed above the plane of the seat structure.

The front bumper 27 is mounted on the front crossbar 21 and the rear bumper 28 is mounted on the downwardly extending rear portions 23b, as will be hereinafter described.

A front post generally indicated 29, carrying at the top a handle 30, is mounted on the forward end of the seat member 20. At the forward end of the member 20 an aperture 35 is provided to receive the forward post structure in a manner and for a purpose to be described hereinafter.

A back rest structure 31, formed of sheet metal or other suitable material, is fastened to the member 20 at the rear portion thereof and has its upper edge rolled or beaded over a rod 32 which extends forward in a curved shape toward the front post 29 to enclose the passenger space of the vehicle. The forward portion of the rod 32 carries attached thereto a tray member 33, which is supported by a bracket 34, affixed to the post 29. The seat member 20 may be of the general shape shown by the detail in Fig. 4 and preferably is formed of wood, though sheet metal pressed to a corresponding shape may be used.

Figure 6:
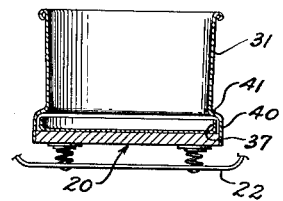
Fig. 6 is a vertical section taken along the line 6—6 of Fig. 2.
Figure 3:
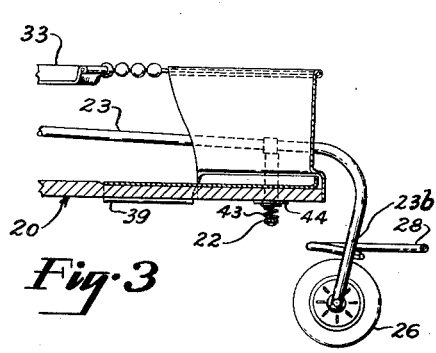
Fig. 3 is a partial longitudinal median section taken along the line 3—3 in Fig. 2.
Figure 4:
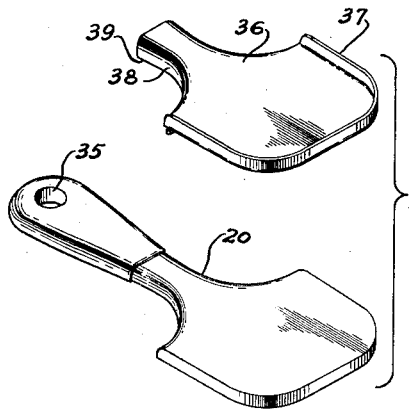
Fig. 4 is a detail view of the passenger supporting or seat member of the vehicle with a detachable seat cover of corresponding form.
Figure 5:
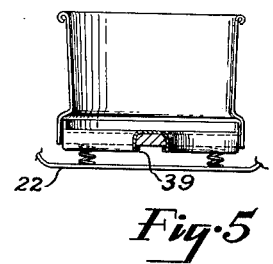
Fig. 5 is a section taken through the passenger supporting member and the removable seat cover taken along the line 5—5 in Fig. 2.

If desired a detachable seat cover 36, preferably formed of some flexible plastic material in the general shape shown in Fig. 4 may be provided, which conforms in shape to member 20 so that it may fit thereover, as shown by the sections in Figs. 3, 5 and 6, without exposing sharp edges. An upright flange 37 is provided at the sides and rear of this member while the curved portions 38 extend downwardly along the corresponding curved portions of member 20 and have an inwardly beaded edge 39 which projects inwardly under the bottom edge of member 20 to retain the seat cover thereon. Due to the resiliency of the plastic material used for the seat cover it may be snapped on or off the member 20, being held there by the edges 39 due to resiliency of material used. The back rest 31 has an outwardly offset portion 40 to accommodate the flanged portion of the seat cover 36 between the shoulder 41 and the member 20, and thereby to retain the same in place. The cover 36 is put on the seat by inserting the flanged portion under the shoulder 40 at the forward end of the back rest, sliding the cover back into position, and then pushing the curved forward part of the cover downward until the edges 39 snap into position underneath the seat. Such a cover with flanged sides and rear has the advantage of preventing dirt and moisture from reaching the joint between the seat member 20 and the seat back 31 should an infant wet the vehicle, and hence prevents rusting at the joint. At the same time the cover itself is readily removed for cleaning.

As shown in Fig. 3, the seat member 20 is supported by helical compression springs 43 interposed between the rear crossbar 22 and the member 20, the lower ends of the springs being held to the crossbar 22 by bolts, rivets or other suitable means, and the upper portion being retained in position by a spring retaining plate 44 affixed to the underside of member 20. The crossbar 22 has its ends extending upwardly toward the side members 23, to which its ends are affixed by circular strap clamp formations 45 and bolts 46.

As hereinbefore indicated, the front post is attached to the forward end of member 20 (Fig. 7) and two flanged and centrally apertured metal cup-shaped clamping members 51 and 52 are disposed with their cupped portions projecting into the top and bottom ends, respectively, of the hole 35, thereby to permit the flanges to grip the seat member. An apertured ornamental cover plate 54, placed over the upper cup 51 to give bracing to the post tube 55, is held in place by a circumferential ridge 57 formed on front post tube 55, which is passed through the aperture in the top of plate 54 and rests in the inner side of the cup-shaped depression of the flanged member 51. The handle 30, which may be of stamped metal or other suitable material, has an aperture 58 provided therein to receive the upper end of the tube 55. All of the foregoing described post and post mounting members are held together by a bolt 60 with head 60b, which abuts against the top of the handle and is passed through the post tube 55, cups 51 and 52, and washer 61. The whole structure is held together firmly by a nut 62 drawn up on the lower threaded portion 60a of bolt 60. The lower portion of the bolt 60 passes through a disk 63, of rubber or other resilient material, and through the crossbar 21. A lock washer 64 and nut 65 serve to draw the seat member 20 down upon the tube 21.

The front bumper comprises a curved front rod 70 of the general shape shown in Fig. 8 which is sheathed in a tube 71 of rubber or similar material. The ends 73 of the front bumper rod are passed from the rear toward the front through holes in the tubular crossbar 21, and are provided with flanges 74 or nuts, or some similar securing device to abut against the outside of tube 21. Thus the forward part of the rod ends extending through to the front side of the tube may be threaded to receive ornamental nuts 75 which hold the bumper ends in place. As shown in Fig. 7 the side portions of the bumper in curving around behind the crossbar are somewhat elevated above the general bumper level, making the nuts 75 more accessible from the front during assembly. It is seen that with the bumper structure shown both the front and sides of the vehicle, as well as the front caster type wheel mountings, are prevented from bumping against furniture.

The structural relation of member 23 to the crossbar 21 is more clearly shown in Figs. 7 and 8. The forward end of the member 23 following the curved portion has a straight vertical end portion 23a which passes through holes provided at the outer ends of member 21 and extends downwardly below the same. The front portions 23a of side members 23 may be affixed to member 21 by brazing or other suitable means. Generally, end caps 76 are provided to cover the open ends of tubular member 21. The rear bumpers 28 are similar in construction and method of attachment to the front bumper 27, the ends thereof being passed, however, through holes in the downwardly extending rear ends 23b of member 23.

The vehicle of this structure has the advantage that the sub-assemblies shipped from the manufacturing plant are simple to assemble in a correct and ready manner. The main sub-assembled units are the chassis, comprising the front crossbar 21, side members 23 and the rear axle 25; the entirety of the structures borne by seat member 20, comprising the seat member 20, springs and back cross-strap 22, the whole front post structure 29, the seat back rest 31 and tray 33 with connecting members. For the final assembly of the vehicle at the distribution point, the seat assembly is placed on the chassis with the lower threaded portion 60a of bolt 60 through the central hole in the crossbar 21; the ends of the rear crossbar 22 are bolted onto the circular strap clamp 45; lock washer 64 and nut 65 are drawn up on bolt 61; the front and rear bumpers are inserted through their respective apertures in the tubular members 21 and 23 and their nuts drawn tight; the center shafts of the front wheels are inserted into the ends of member 23; and finally the wheels are placed on the rear axle 25 to complete the final assembly. The front and rear wheels can be factory assembled to form part of the chassis sub-assembly, if desired, without detracting from the ready and compact packageability of the sub-assembled walker.

The general proportioning of the completed assembly is such that the upper or horizontal reaches of the side tubular members 23 are disposed near the vertical plane of the mass center of the vehicle when manually carried in a side ended position by using the tube 23 as a handle.

We claim:

1. In a vehicle such as a baby walker and the like having a pair of tubular side members connected by front and rear transverse members in the vehicle frame, a seat structure comprising a seat member extending longitudinally of the vehicle over the said transverse members; a plurality of helical compression springs interposed between the said rear transverse member and the seat member, each of said helical springs being attached to said rear transverse member and to said seat member; bolt means securing the forward end of said seat member to said front transverse member; and an elastic washer member interposed on said bolt means between said front transverse member and said seat member at the middle of said front transverse member.

2. In a vehicle such as a baby walker and the like, a frame comprising a pair of tubular side members each having a generally inverted U-shape, each of said side members being curved downwardly at the front to terminate in a vertically disposed tubular section adapted to serve as a socket for a caster type front wheel and curved downwardly at the rear to engage a rear axle; a tubular front transverse member provided near each end with diametrically disposed apertures through which said vertical sections of the side members extend and to which the side members are rigidly secured; an axle extending through the ends of the rear downwardly extending parts of said side members; said tubular side members being connected by a transverse seat supporting member near the rear thereof; a seat structure resiliently supported on the tubular front transverse member and said seat supporting member, and said side tubular members having substantially horizontal reaches disposed above the plane of the seat member.

3. In a juvenile vehicle having tubular frame members including a front transversely extending tubular member connected to side tubular members: a bumper comprising a curved resilient metal member extending substantially across the width of the vehicle in front of said transversely extending frame member, and having laterally extending outer portions curved around to the inner side of said tubular frame member to extend through apertures provided in the transverse tubular frame member, flanges on the said resilient bumper member abutting against the tubular frame member, and fastening means on the ends of said resilient bumper member drawn up against the transverse tubular frame member to hold the bumper on the tubular frame member.

4. In a juvenile vehicle having a frame formed of tubular members, a bumper comprising a curved resilient metal member extending substantially across the width of the vehicle, and having laterally extending outer portions each curved around from one side to the opposite side of a corresponding adjacent portion of the tubular frame members to extend through apertures provided in the said corresponding adjacent portion of the tubular frame, flanges on the said resilient member spaced inward from the ends thereof and abutting against the tubular frame, a tough resilient covering material on said resilient member extending between said flanges, and fastening means on the ends of said resilient member to hold the same on the tubular frame.

5. In a juvenile vehicle such as a baby-walker or the like in which the forward end of the seat member thereof is supported by a transverse frame member, the seat member having an aperture therethrough above said frame member: a front post assembly comprising a pair of centrally apertured cupped metal disks, said disks being oppositely disposed on the upper and lower sides of the seat member with the cupped portions in the aperture thereof; an upright post tube resting in the cupped portion of the upper one of said disks; a laterally extending hand member on the top of said tube; a bolt extending down through said hand member, said tube, said cupped disks, and said transverse frame member; a nut drawn on the bolt beneath the lower of said cupped disks for clamping the seat member to the post assembly; and a second nut drawn up on the end of the bolt against said transverse frame member for clamping the seat member and post assembly to said transverse member.

6. In a juvenile vehicle such as a baby walker or the like in which the forward end of the seat member thereof is supported by a transverse frame member, the seat member having an aperture therethrough above said frame member: a front post assembly comprising a pair of centrally apertured cupped metal disks, said disks being oppositely disposed on the upper and lower sides of the seat member with the cupped portions in the aperture thereof; an upright post tube resting in the cupped portion of the upper one of said disks; a laterally extending hand member on the top of said tube; a resilient disk beneath the lower of said disks; a bolt extending down through said hand member, said tube, said cupped disks, said resilient disk, and said transverse frame members; a nut drawn on the bolt beneath the lower of said cupped disks for clamping the seat member to the post assembly; and a second nut drawn up on the end of the bolt against said transverse member for clamping the seat member and post assembly to said transverse member.

7. In a juvenile vehicle such as a baby walker or the like in which the forward end of the seat member thereof is supported by a transverse frame member, the seat member having an aperture therethrough above said frame member: a front post assembly comprising a pair of centrally apertured cupped metal disks, said disks being oppositely disposed on the upper and lower sides of the seat member with the cupped portions in the aperture thereof; an upright post tube resting in the cupped portion of the upper one of said disks; a laterally extending hand member on the top of said tube; a cover plate over the upper of said metal disks, said post tube passing through the cover plate; a bolt extending down through said hand member, said tube, said cupped disks and said transverse frame member; a nut drawn on the bolt beneath the lower of said cupped disks for clamping the seat member to the post assembly; and a second nut drawn up on the end of the bolt against said transverse frame member for clamping the seat member and post assembly to said transverse member.

8. In a baby walker or like vehicle, a combination of sub-assemblies adapted for compact shipping and ready assembly of the vehicle comprising a tubular type chassis unit, a seat unit, a pair of swivel front wheel units and a pair of rear wheels therefor; said chassis unit comprising a pair of inverted generally U-shaped tubular side members each having depending front and rear portions, a front tubular cross-bar provided near each end with a pair of diametrically disposed apertures through which the depending front portions of said side members extend and in which the said front portions are fixed, said cross-bar being provided with a centrally located pair of diametrically disposed apertures, and a rear axle for said rear wheels extending through and spacing the rear portions of said side members; said seat unit comprising a longitudinally extending passenger carrying member, a transverse member supporting the rear of said carrying member, and having at both ends means for securing the rear of said seat unit to said side members of the chassis unit, and a hand-grip member secured to the forward end of said carrying member and including bolting means passed through said centrally located apertures for securing the front end of said seat unit to the chassis unit; and said swivel wheel units including swivel stem mounting means adapted for insertion and retention in the ends of said depending portions of the side members of the chassis.

ALVIN P. DOUGLAS.
LEONARD J. WALTERS.

References Cited in the file of this patent

UNITED STATES PATENTS

| Number | Name | Date |
|---|---|---|
| D. 163,827 | Schreckengost | July 3, 1951 |
| D. 163,828 | Schreckengost | July 3, 1951 |
| 2,202,065 | Peebles | May 28, 1940 |
| 2,288,469 | Lookholder | June 30, 1942 |
| 2,392,938 | McGregor | Jan. 15, 1946 |
| 2,426,432 | Breckner et al. | Aug. 26, 1947 |
| 2,435,022 | Troendle | Jan. 27, 1948 |
| 2,455,168 | Gilmore | Nov. 30, 1948 |
| 2,471,004 | Moster | May 24, 1949 |
| 2,527,434 | Little et al. | Oct. 24, 1950 |
| 2,534,539 | Topper | Dec. 19, 1950 |
| 2,570,091 | Bennett | Oct. 2, 1951 |